(12) United States Patent
Speicher

(10) Patent No.: US 10,647,378 B2
(45) Date of Patent: May 12, 2020

(54) HIGH PERFORMANCE MOTORCYCLE

(71) Applicant: John M. Speicher, Geyersville, CA (US)

(72) Inventor: John M. Speicher, Geyersville, CA (US)

(\*) Notice: Subject to any disclaimer, the term of this patent is extended or adjusted under 35 U.S.C. 154(b) by 0 days.

(21) Appl. No.: 16/202,018

(22) Filed: Nov. 27, 2018

(65) Prior Publication Data
US 2019/0092422 A1 Mar. 28, 2019

Related U.S. Application Data

(62) Division of application No. 15/296,808, filed on Oct. 18, 2016, now Pat. No. 10,155,561, which is a division of application No. 14/216,994, filed on Mar. 17, 2014, now Pat. No. 9,469,363.

(60) Provisional application No. 61/788,988, filed on Mar. 15, 2013.

(51) Int. Cl.
| | |
|---|---|
| *B62K 25/26* | (2006.01) |
| *B62K 11/04* | (2006.01) |
| *B62K 25/04* | (2006.01) |
| *B62M 7/04* | (2006.01) |
| *B62M 9/16* | (2006.01) |
| *B62K 11/08* | (2006.01) |
| *B62K 25/08* | (2006.01) |
| *B62M 9/06* | (2006.01) |

(52) U.S. Cl.
CPC .............. *B62K 25/26* (2013.01); *B62K 11/04* (2013.01); *B62K 11/08* (2013.01); *B62K 25/04* (2013.01); *B62K 25/08* (2013.01); *B62M 7/04* (2013.01); *B62M 9/06* (2013.01); *B62M 9/16* (2013.01); *B60Y 2200/12* (2013.01); *B60Y 2400/86* (2013.01); *B62K 2201/04* (2013.01)

(58) Field of Classification Search
CPC ........ B62K 25/20; B62K 25/26; B62K 25/04; B62K 2201/00; B60Y 2200/12; B60Y 2400/86
See application file for complete search history.

(56) References Cited

U.S. PATENT DOCUMENTS

| | | |
|---|---|---|
| 4,392,542 A | 7/1983 | Aiba |
| 4,667,762 A | 5/1987 | Ishino |
| 4,697,664 A | 10/1987 | Kohyama |
| 5,390,758 A | 2/1995 | Hunter |
| 6,053,272 A | 4/2000 | Koyanagi |
| 6,315,072 B1 | 11/2001 | Brown |

(Continued)

*Primary Examiner* — Tony H Winner
(74) *Attorney, Agent, or Firm* — Craig M. Stainbrook; Stainbrook & Stainbrook, LLP

(57) ABSTRACT

A high performance motorcycle having a frame, engine suspension, and rear wheel drive system that enables rider foot positioning close to the longitudinal centerline of the motorcycle and an overall aerodynamic profile. The engine suspension, centering and damping system allows for lateral movement while damping vibration and unwanted oscillations. The rear wheel drive includes a driven pulley axially disposed on a rear wheel axle, a drive pulley configured to receive motive output from the motorcycle engine, an idler pulley disposed above a line between the axes of rotation of the drive pulley and the rear wheel axle, and a belt or chain disposed around and operatively connecting the drive pulley, the driven pulley and the idler pulley, wherein the idler pulley and the drive pulley configured so as to provide substantially constant tension to a belt or chain over the range of travel of the rear suspension.

11 Claims, 20 Drawing Sheets

(56) References Cited

U.S. PATENT DOCUMENTS

| | | | |
|---|---|---|---|
| 6,758,296 | B2 | 7/2004 | Inaoka |
| 6,823,960 | B2 | 11/2004 | Shimizu |
| 6,902,023 | B2 | 6/2005 | Brendelson |
| 9,469,363 | B1 | 10/2016 | Speicher |
| 10,155,561 | B2 | 12/2018 | Speicher |
| 2002/0027034 | A1 | 3/2002 | Tsutsumikoshi |
| 2003/0106733 | A1 | 6/2003 | Keller |
| 2008/0179125 | A1 | 7/2008 | Glover |
| 2009/0223731 | A1 | 9/2009 | Arnold |
| 2012/0223505 | A1 | 9/2012 | Ikeda |
| 2012/0318601 | A1 | 12/2012 | Kuroki |
| 2016/0264207 | A1 | 9/2016 | Platz |
| 2016/0355080 | A1 | 12/2016 | Wada |

HIGH PERFORMANCE MOTORCYCLE

CROSS REFERENCES TO RELATED APPLICATIONS

The present application is a divisional of U.S. Utility patent application Ser. No. 15/296,808, filed Oct. 31, 2016 (Oct. 31, 2016), which in turn is a divisional of U.S. Utility patent application Ser. No. 14/216,994, filed Mar. 17, 2014 (Mar. 17, 2014), now U.S. Pat. No. 9,469,363, issued Oct. 18, 2016 (Oct. 18, 2016), which claims the benefit of U.S. Provisional Patent Application Ser. No. 61/788,988, filed Mar. 15, 2013 (Mar. 15, 2013).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

Field of the Invention

The present invention relates generally to motorcycles, and more particularly to high performance motorcycles, and still more particularly to a lightweight aerodynamic motorcycle frame design having improved cornering and handling characteristics, an improved and safer frame configuration for a rider's feet, an engine suspension system capable of damping frame oscillations, and a rear suspension system that provides constant belt tension and exhibits constant anti-squat characteristics.

Background Discussion

Motorcycle designs are both art and engineering. Nothing delights the informed eye more than seeing mechanical and aerodynamic advantage embodied elegantly. That is what engineers and designers working collaboratively in the motorcycle world endeavor to achieve. Thus, the ever astounding futuristic designs rolled out annually by the major manufacturers are nothing if not high performance fashion statements. Simply put, they are beautiful. Yet, over the years improvements in performance have lagged behind improvements in design, and there remain many motorcycle performance characteristics calling for improvement. In short, the art is not perfected. The present invention is therefore not stingy in that regard, as it provides numerous advances in the art, and thus numerous advantages in design. They are described in detail herein.

BRIEF SUMMARY OF THE INVENTION

The present invention is an improved high performance motorcycle design.

It is first and principal object of the present invention to provide a new and improved motorcycle design that allows increased lean angle before making road contact with the foot pegs/plates or with the rider's feet.

It is another object of the present invention to provide a new and improved motorcycle design that allows a lower rider position and therefore a lower overall center of gravity of the rider and motorcycle in combination.

It is another object of the invention to provide a motorcycle design with reduced frontal area and concomitantly improved aerodynamic characteristics including reduced wind resistance and drag.

It is another object of the present invention to provide a motorcycle design having a final drive belt/chain held in constant, effectively unchanging tension.

Yet another object of the present invention is to provide an improved motorcycle design that dampens natural motorcycle modes of oscillation detrimental to performance.

A still further object of the present invention is to provide a motorcycle design having foot and leg protection for a rider to reduce injuries due to side impacts.

A further object of the present invention is to provide a motorcycle having a frame, fuel tank, and seat unified and combined in a monocoque design to reduce weight.

Another object of the present invention is to provide a motorcycle design having a very lightweight and low cost rear suspension with constant anti-squat characteristics while also providing constant belt or chain tension.

A still further object is to provide a motorcycle design having improved traction when hitting bumps in turns at large lean angles.

Yet another object of the invention is to provide a motorcycle having an engine and transmission that can be rapidly and easily removed with a minimum disturbance to of other vehicle parts, thereby reducing maintenance time and costs.

The foregoing summary broadly sets out the more important features of the present invention so that the detailed description that follows may be better understood, and so that the present contributions to the art may be better appreciated. The additional features of the invention that will be described in the detailed description of the preferred embodiments of the invention will form the subject matter of the claims appended hereto.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
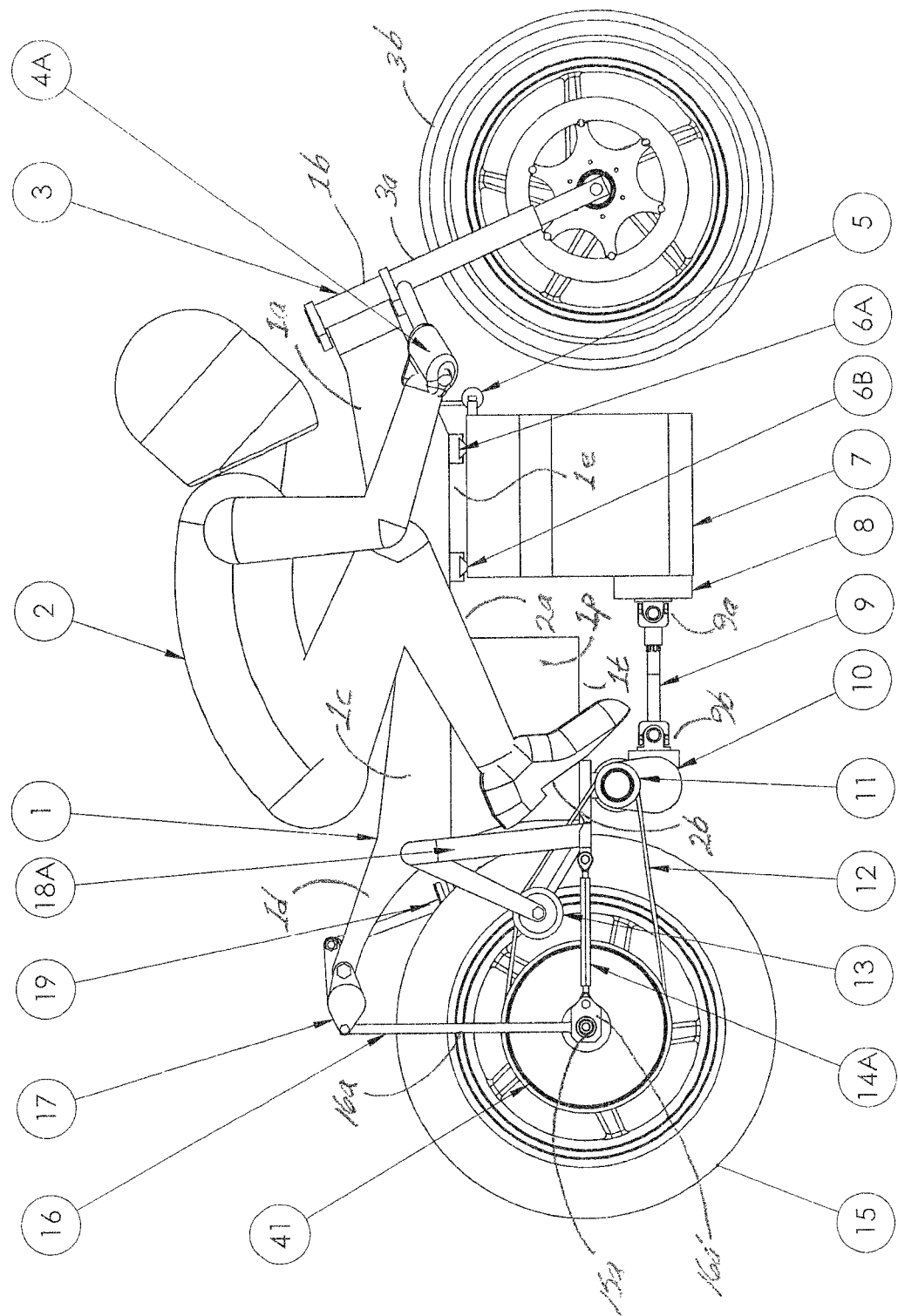
FIG. 1 is right side view in elevation of the high performance motorcycle of the present invention, showing the position of a rider properly seated for travel at speed.
Figure 2:
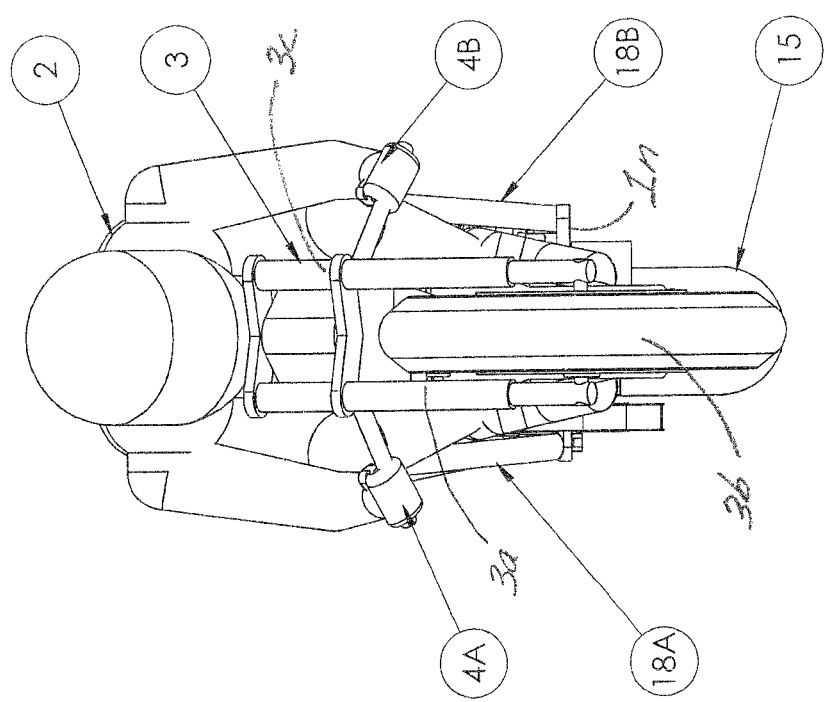
FIG. 2 is a front view in elevation thereof.
Figure 3:
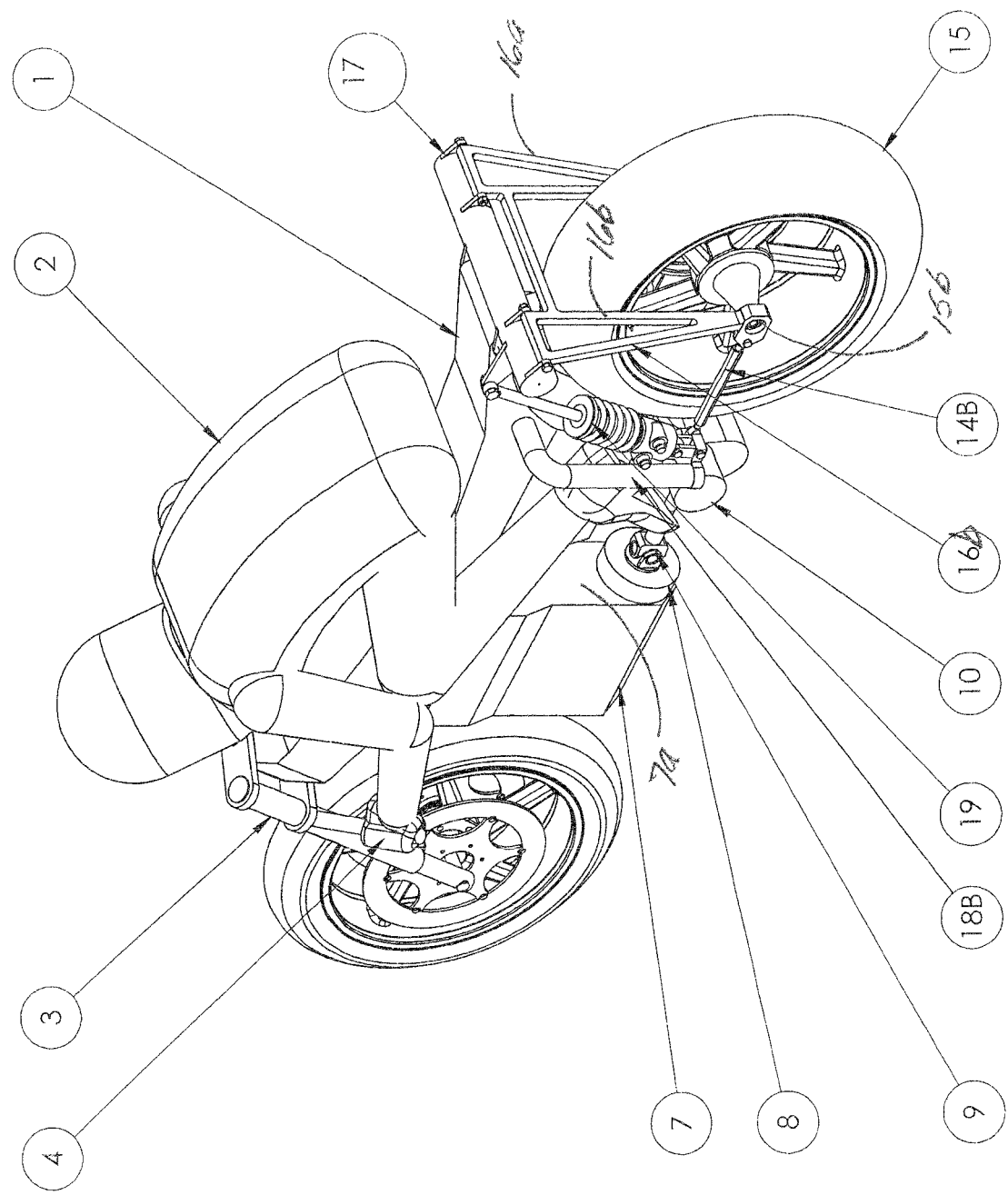
FIG. 3 is an upper rear left perspective view thereof.
Figure 4:
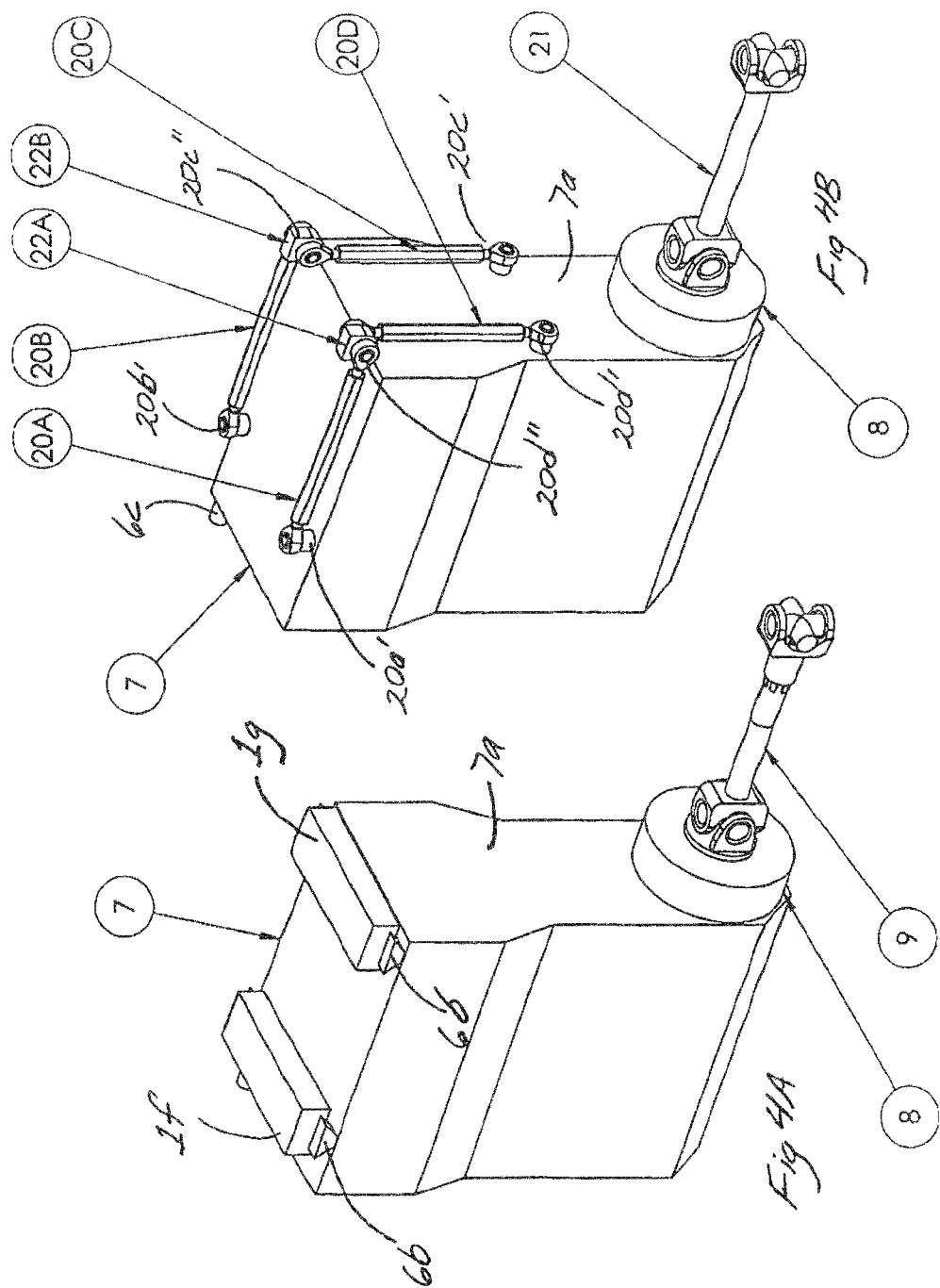
FIG. 4A is an upper left rear perspective view of the engine featuring its mounting and suspension system.
FIG. 4B is an upper left rear perspective view of an alternative engine mounting and suspension system.

Referring to FIGS. 1 through 19, wherein like reference numerals refer to like components in the various views, there is illustrated therein a new and improved high performance motorcycle. Looking first at FIGS. 1 through 3 and FIG. 6, there is illustrated therein a new and improved high performance motorcycle. FIGS. 1-3 illustrate a first preferred embodiment of the motorcycle, showing that the inventive vehicle includes a monocoque frame 1, having a front portion 1a with a head tube 1b, a seating portion 1c, and a rear portion 1d. A rider 2 is shown in a proper position for forward travel at speed. However, the frame is shown without either a seat or fuel tank mounted on the frame.

Rotatably coupled to the frame head tube 1b is a conventional front steering and suspension system, including telescopic front forks and suspension 3a, a front wheel 3b, and a steering head 3c. Left and right handle bars and grips 4a, 4b, are connected to the lower portion of the steering head in a well-known manner, so as to bring the rider's upper body into a lowered, aerodynamic position on the motorcycle, especially evident in FIGS. 2-3.

Engine or motor 7 ("engine" herein) is mounted to the underside 1e of the front portion 1a of frame 1 and is positioned so as to be located in front of and below the rider's shins 2a. The engine is shown sized as a typical inline 2-4 cylinder motorcycle engine crankcase, block, and head. It is shown as a "box," both suggesting the variations possible in the power source and the fact that the engine may be in an enclosed or compartment. It will be understood, therefore, that the "engine" employed in the present invention could be many kind of power source for converting energy to motion and made suitable for use in motorcycles, including, but not limited to V-type engines, electric motors with battery packs, flywheel systems, and so forth. The term "engine" as used herein also includes basic engine components, such as pumps, generators, induction systems, exhaust systems, heat exchangers, superchargers, electronics, and the like.

Power from the engine is communicated to the rear wheel through the inventive drivetrain, which includes a clutch 8, located on the rear side 7a of engine 7, and a conventional, linearly adjustable two-piece spline slip joint drive shaft 9 disposed substantially on the longitudinal centerline of the motorcycle and having front and rear end U-joints 9a, 9b, respectively. The spline slip joint permits a degree of length adjustment, which is needed to accommodate engine lateral motion (discussed more fully below). The rear end U-joint 9b is coupled to the input shaft coupler 10a of the input shaft assembly (details not shown) in gear box 10 (see FIG. 6). The clutch 8a, as will be appreciated, may be collocated with the gear box, rather than disposed on the engine housing at the front end of the drive train. Locating the clutch on the engine (see FIG. 1) simplifies the gear box design of the kind described next.

The drive train is a single or multi-speed gear box with an output pulley 11 operatively coupled through belt or chain 12 over idler pulley 13 to rear wheel (driven) pulley 41 coaxially disposed on the hub or axle of rear wheel 15. The system couples the drive shaft 9 to the output pulley 11 through a clutch and multi-speed gear system. The drive shaft and output pulley are oriented normal to one another, and the gear box thus reorients the input drive shaft rotation through a gear assembly (bevel gear set) to a lateral shaft and gear assembly of a kind known in the art. The kind of gear box employed in the motorcycle is therefore not limiting as there are numerous design choices possible for this system. In a possible design choice, the gear box could be organized around an upper transverse shaft on center with the driving pulley and a lower transverse shaft in the plane of the input shaft and bevel. A conventional multi-speed gear "cluster" would couple the upper and lower shafts.

Figure 5:
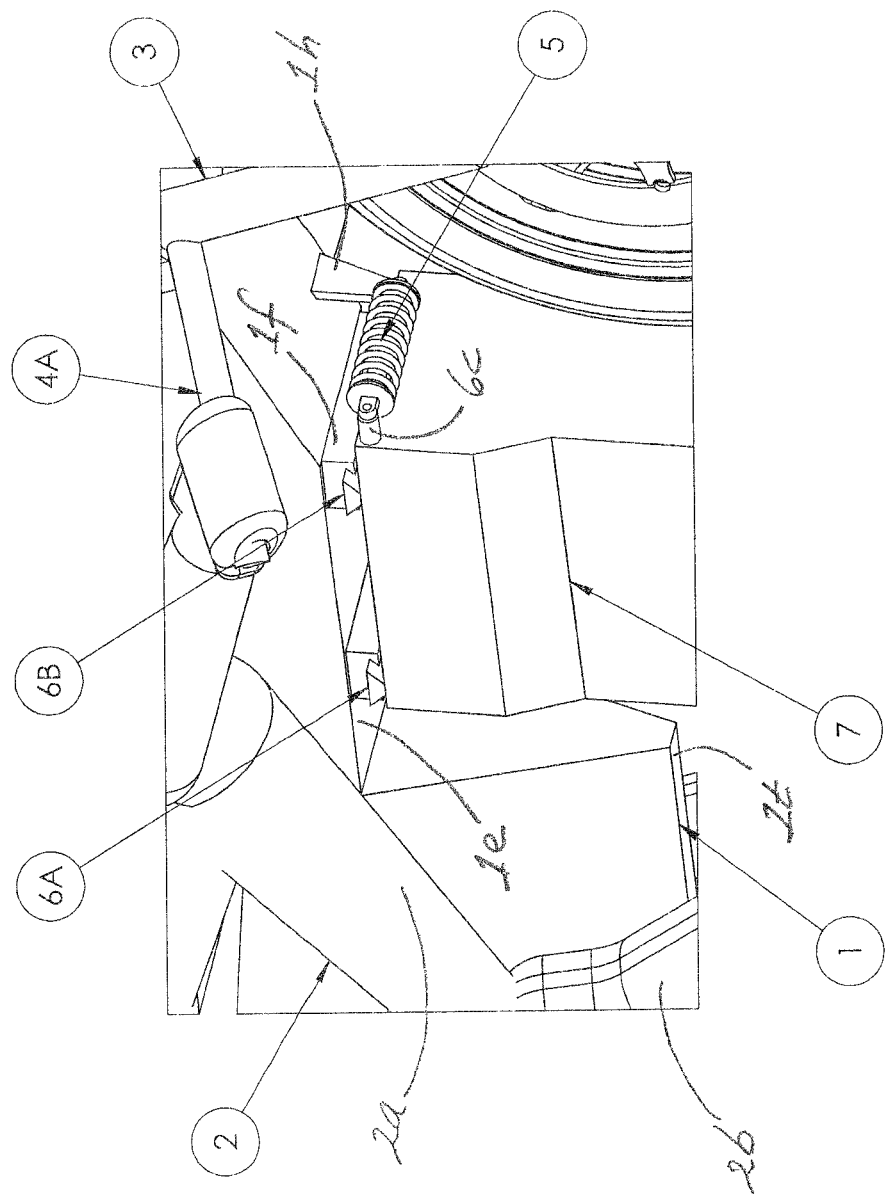
FIG. 5 is a lower right perspective view showing details of the engine/motor lateral motion centering spring and damper.
Figure 6:
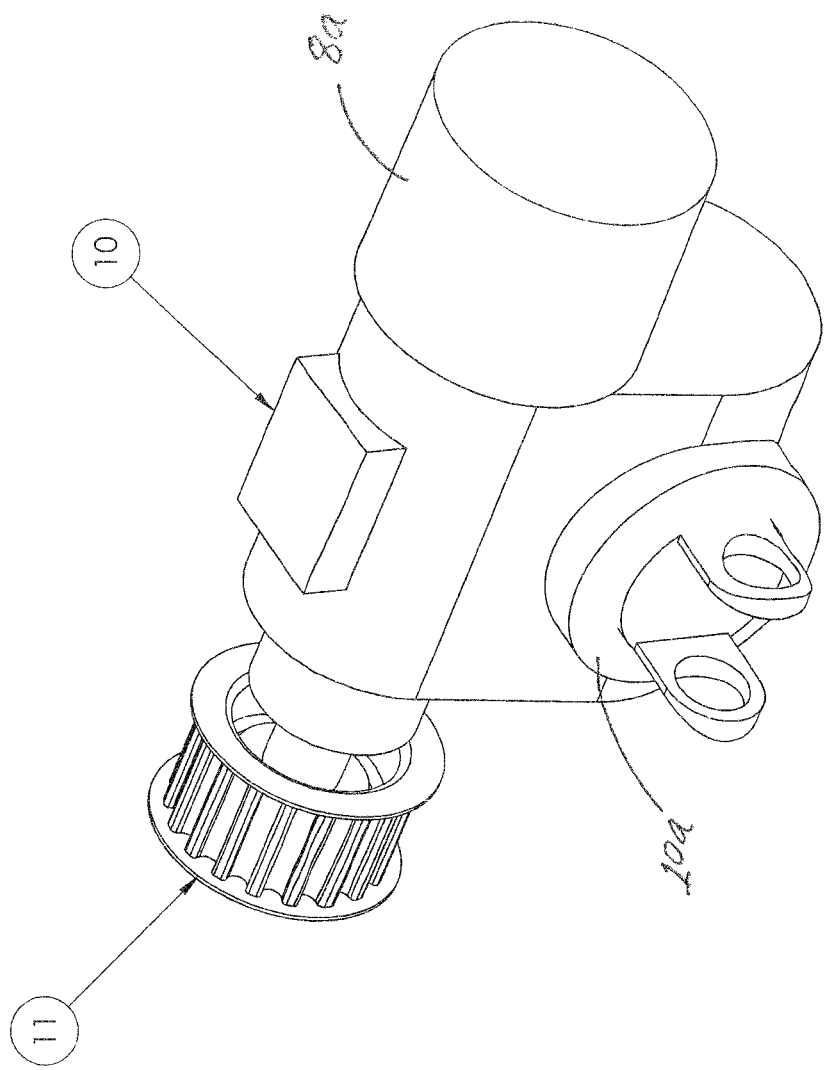
FIG. 6 is an upper front left perspective view of the gear box and clutch.

Referring next to FIG. 4A and FIG. 5, details are shown of how engine 7 is mounted to, and suspended under, the underside 1e of the front portion 1a of the frame 1 using front and rear low friction lateral (linear) slides 6a, 6b. The linear slides are configured as elongate male dovetail elements that insert slidingly into integral or welded motor mounts 1f, 1g, having complementary female dovetail channels. Motor/engine mounting is completed using a motor lateral motion centering spring and damper 5 disposed between a mounting bracket 1h on the front portion of the underside of the frame 1, and an engine-side ball-and-joint coupling 6c. The centering spring and damper assembly keeps the engine centered. Yet, as will be readily appreciated from the views, the linear slides permit lateral translation of the entire engine when the motorcycle is subjected to lateral accelerations. The spring and damper assembly has a centering and a damping effect on any engine motion. The linear slides help isolate engine vibration and reduce the degree to which it is conducted to the rider; lateral motion of the engine absorbs shock and adds damping when the motorcycle travels through turns, and damps the wobble and weave modes of oscillation characteristic of motorcycles. While in a preferred embodiment the slides are configured in triangular dovetails, any of a number of suitable configurations could be employed to provide the kind of sliding suspension achieved in this design. Alternatives might include, for instance, T-shaped male elements. Further, it will be appreciated that the relative (top/bottom) positions of the male and female elements could be reversed.

In the alternative, and now referring to FIG. 4B, the engine can be mounted to the frame using a combination of parallel links that accomplish the same objective as the linear slides but with potential cost and weight savings. As with the linear slides described above, this system of parallel links prevents the engine from rotating relative to the frame. In this preferred alternative embodiment, the centering spring and damper assembly is identical to that used with the linear slides, but rather than transversely oriented slide elements, two mounting tabs 22a, 22b, are affixed to the underside of the frame 1 at the rear portion 7a of the engine 7. The engine is then suspended from the frame using: first, two parallel longitudinally oriented axial links 20a, 20b, each pivotally affixed at a forward ball joint 20a', 20b', and at a rear ball joint 20a'', 20b'' on tabs 22a, 22b, respectively; and second, two parallel vertically oriented axial links 20c, 20d, connected at a lower ball joint 20c', 20d' and at an upper ball joint 20c'', 20d'' on tabs 22b, 22b. In this way, the engine is allowed to translate laterally a short distance as described with respect to the first preferred embodiment. When a parallel link system is employed for engine suspension, a conventional fixed length drive shaft 21 with U-joints at each end is also used. The length of the drive shaft 21 preferably matches that of the longitudinally disposed parallel axial links 20a, 20b. In yet another alternative, the arrangement of parallel links can be accomplished with flexible links operating like leaf springs arranged in parallel rather than using rigid ball joint links.

The rear portion of the motorcycle is characterized by a novel and advantageous rear suspension system that includes dual (right and left) struts or braces preferably configured as triangular arms or frames 16a, 16b. Right and left triangular arms may be connected with a transverse brace or cross-member 16c, which unifies the arms for ease of handling when the system is being assembled. The cross member is not required for correct suspension operation when fully assembled. The triangular arms 16a, 16b are pivotally connected at their lower ends to a fitting 16a', 16b', disposed on rear wheel axle bearing 15a, 15b, and at their respective upper ends to the back of a cross-member 17, which is, in turn, pivotally connected at its front side to the rear portion 1d of the frame 1 (see FIGS. 12-13 for details on these connections). The body of the cross-member is preferably generally cylindrical in shape, and as alternative, cross-member 17 may be adapted for insertion into a portion of the motorcycle frame such that the axis of rotation is the longitudinal axis of the cylindrical body. Right and left adjustable length links 14a, 14b, are each connected to the frame and to a fitting axially disposed on a rear wheel axle bearing or a fitting disposed on a bearing. A rear suspension spring and damper 19 is pivotally connected at the frame 1 and to the rotatable cross member 17. Other connections between the spring/damper assembly and the suspension components to support the weight of the motorcycle are possible. The principal features of the system reside in the cross member, the A-frames, and the adjustable links.

Figure 12:
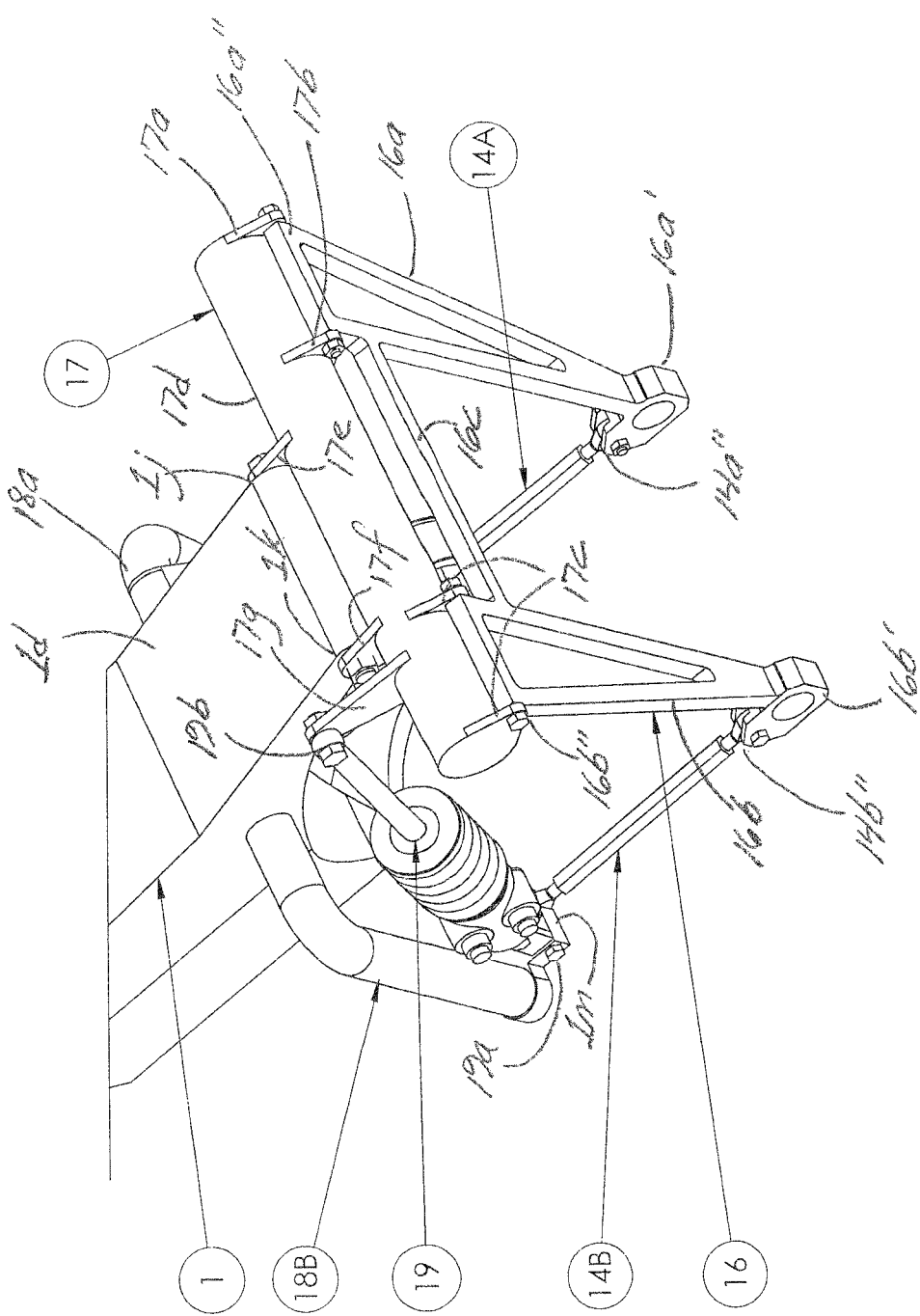
FIG. 12 is an upper left rear perspective view of the rear suspension of the present invention, shown attached to the rear portion of the motorcycle frame.
Figure 13:
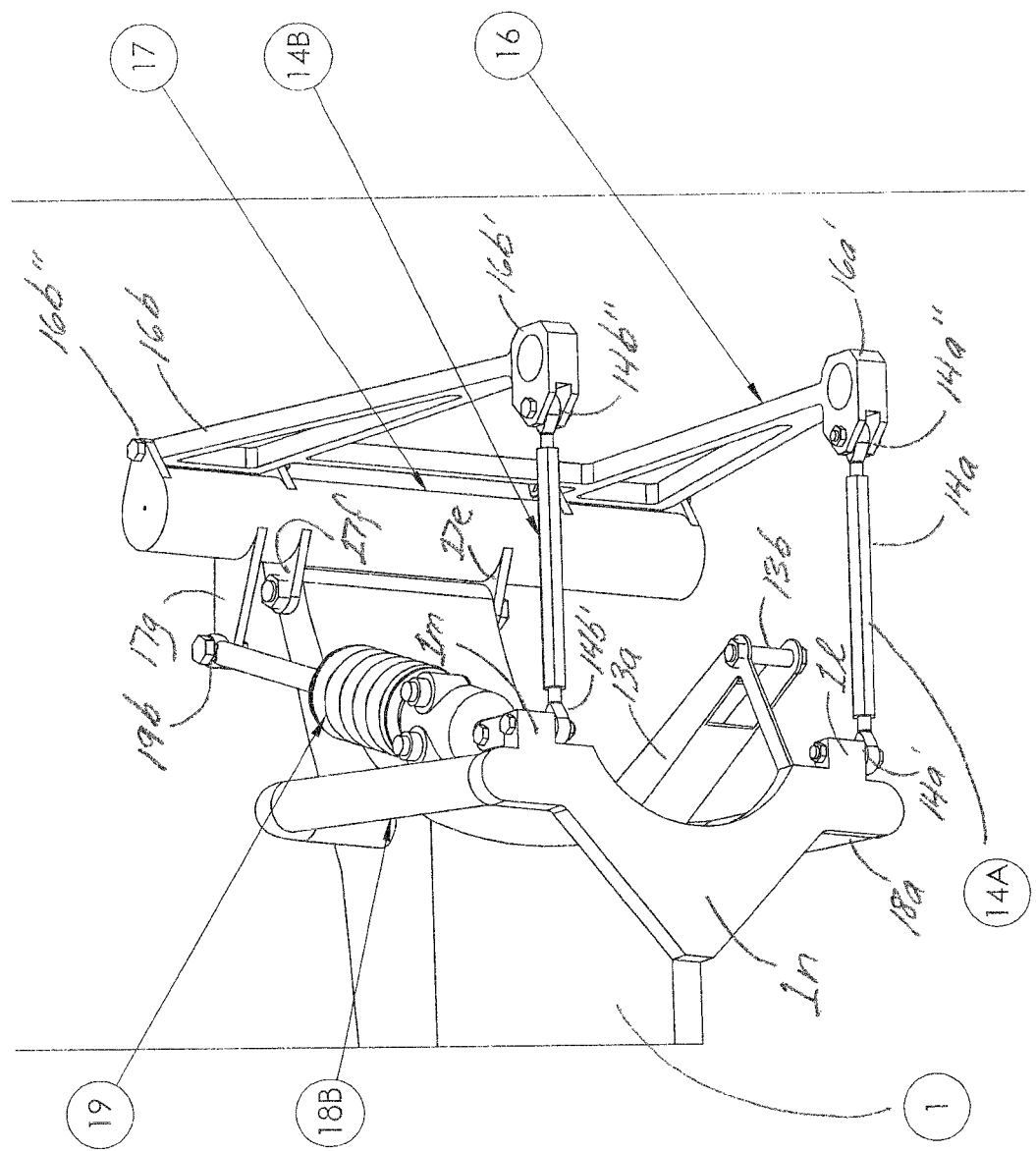
FIG. 13 is a lower left perspective view thereof.
Figure 14:
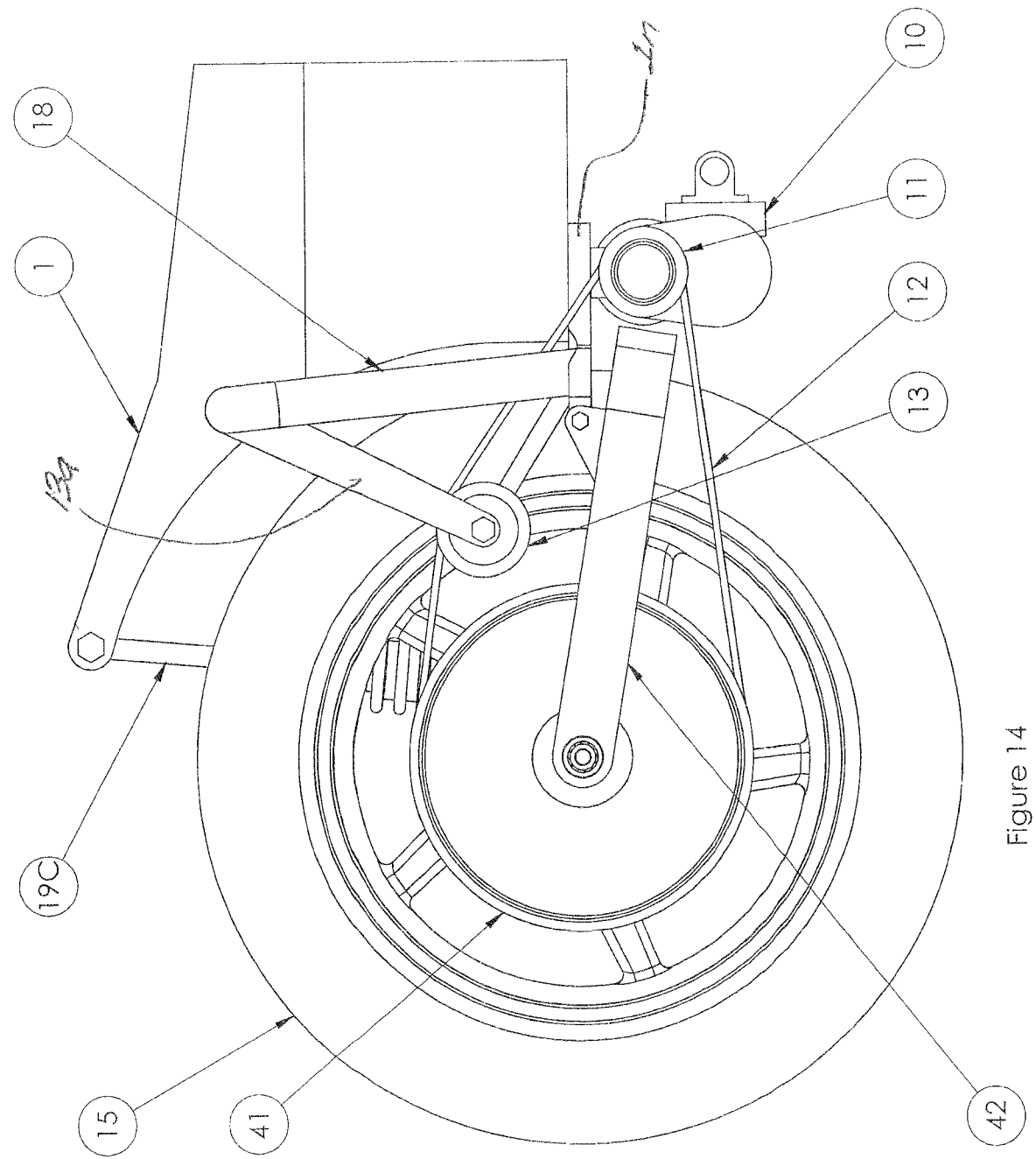
FIG. 14 is a right side view in elevation of the rear portion of the inventive motorcycle showing how the procedure for achieving constant belt tension and anti-squat characteristics can be achieved using a conventional swing arm.
Figure 15:
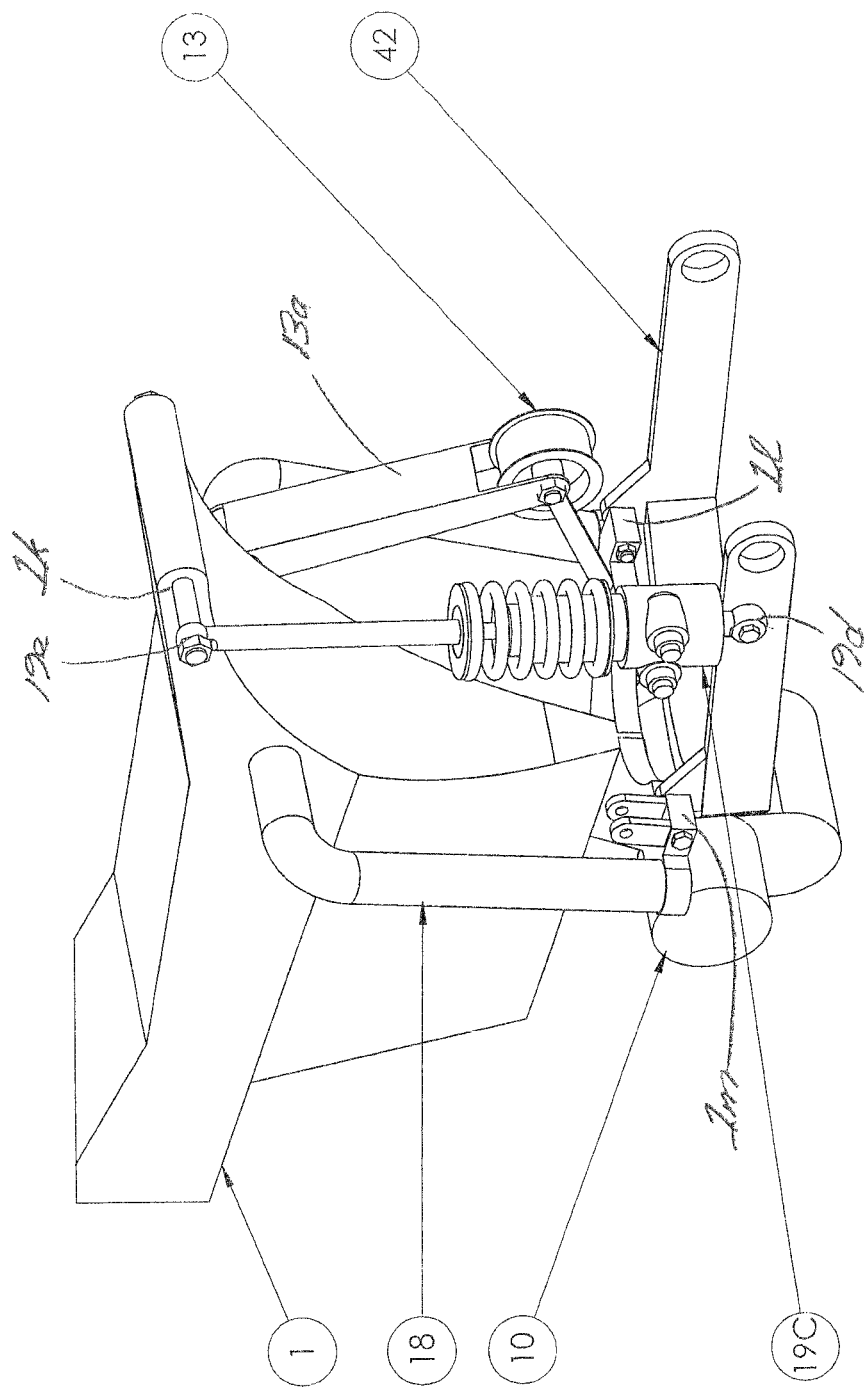
FIG. 15 is an upper left rear perspective view thereof.
Figure 16:
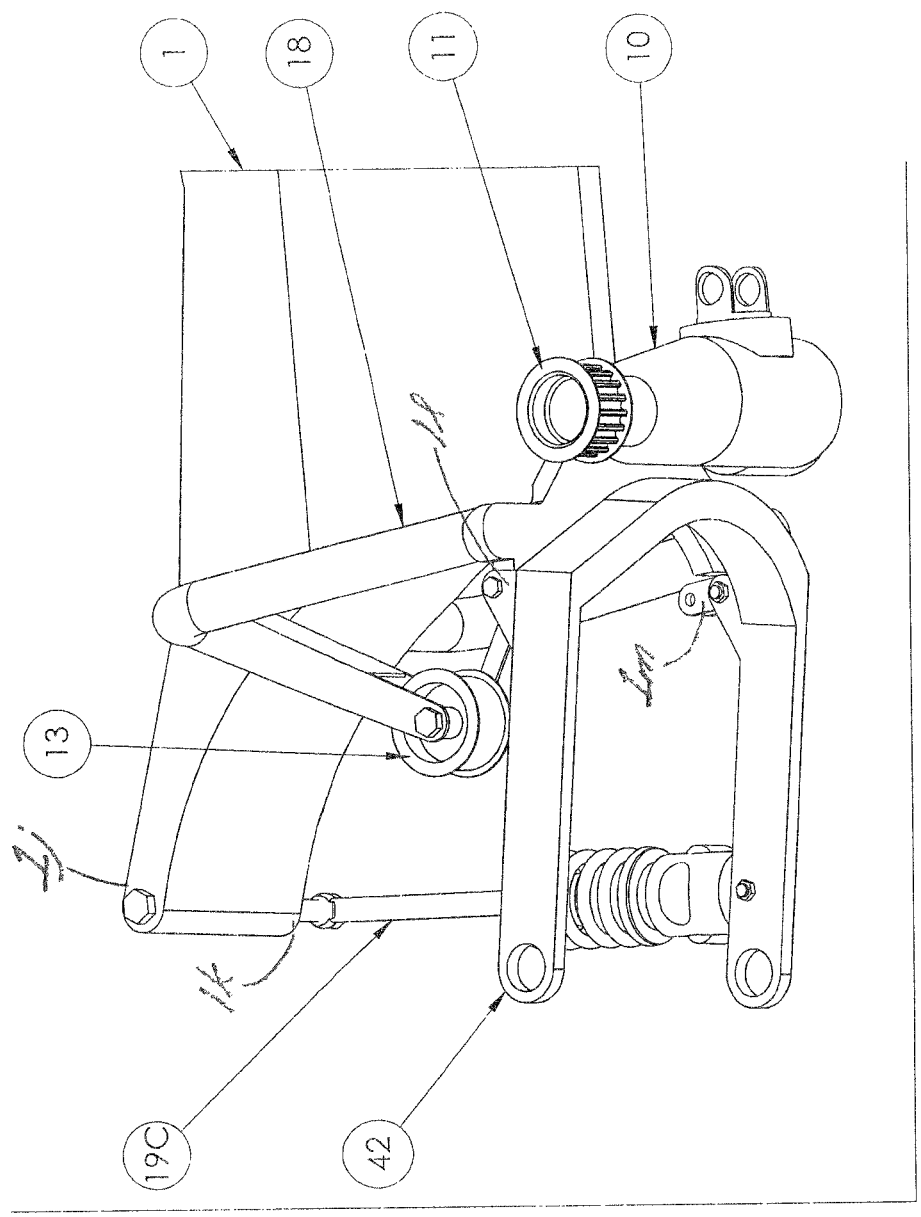
FIG. 16 is a lower right perspective view thereof.

Details of the mechanical elements of the rear suspension are better appreciated by reference to FIGS. 12-13, where it is seen that right and left triangular arms 16a, 16b are pivotally connected at their lower ends to fitting 16a', 16b', disposed on rear wheel axle bearing 15b. They are pivotally connected at an upper end 16a'', 16b'' to the back 17a of a cross-member 17 on right and left mounting bracket pairs 17b, 17c. Rotatable cross-member 17 is pivotally connected at its front side 17d to mounting bosses 1j, 1k at the rear portion 1d of frame 1. The right and left adjustable length links 14a, 14b, are connected to frame mounting points 1l, 1m with forward ball joints 14a', 14b' and to fittings 16a', 16b' with rear ball joints 14a'', 14b''. The left rear suspension spring and damper 19 is pivotally connected at a lower end 19a to the mounting point 1m on frame 1 and at an upper end 19b to a mounting bracket 17g on the front side 17d of the rotatable cross member 17. It will be understood that the riding characteristics of the present invention are best achieved by proper selection and tuning of shock absorbers according to the precise use or uses to which the machine will be put. But a wide range of suitable coil spring and hydraulic shock options is contemplated. (Note: the anti-squat characteristic as used herein is not understood to be a function of the spring/damper response. Anti-squat means the rear suspension and belt system work together to produce a down force on the wheel as torque that would drive the motorcycle forward is generated on the wheel. This down force counteracts some of the load transferred back to the rear wheel and reduces the suspension compression. See Foale reference below for more detail.)

FIG. 13 also shows L-shaped idler pulley mounting arm 13a supporting idler pulley axle 13b, the arm being disposed above and behind the rider foot plate 1n, which supports a rider's feet between right and left side impact protection bars 18a, 18b (shown in several of the views) that reduce a rider's leg injury in the event of a side impact.

The configuration shown in FIGS. 1-5 makes possible a significantly improved rider position. When looked at from the side (FIG. 1), the rider position looks entirely conventional, but it is noticeably different when viewed from the front and the upper rear (FIGS. 2 and 3, respectively), where it is seen that the rider's feet are moved substantially inwardly (toward the longitudinal center line of the motorcycle). On a conventional motorcycle, the rider's feet are positioned outside the chain and swing arm, often making the feet the first part to hit the ground when leading the motorcycle/rider combination. In consequence, the rider must be positioned higher on the motorcycle so as to prevent the feet from hitting the ground at high (but typically encountered) lean angles.

However, in the present invention, the drive shaft is selected and sized to be long enough that it permits the rider's feet to be positioned on rider footrests located between the engine/motor and the gear box, and thus for each foot to be positioned proximate the center plane of the motorcycle. By moving the rider's feet inwardly, the configuration of the present invention permits the rider to assume a position that is lower (overall) on the motorcycle, while at the same time preventing foot-ground contact at high lean angles. This creates a more aerodynamic position and a lowered center of gravity, and therefore better handling and cornering and increased safety.

Exposing less of the rider's feet and lower legs to the airstream also reduces the aerodynamic drag. Although not shown, the reader should assume that conventional aerodynamic devices could be added to further improve the aerodynamics of the inventive motorcycle. Examples of such devices include fairings, ducts, wind shields, fenders, spoilers, turbulators, etc., mounted to the frame, engine or suspension components.

However, another challenge facing the designer is the question of how to provide for an appropriate "anti-squat" factor of the rear suspension. Ideally, the suspension displays a constant "anti-squat" factor over its range of travel. (For an explanation of the anti-squat factor, the reader is referred to Chapter 9 of *Motorcycle Handling and Chassis Design*, self-published by Tony Foale, 2002, ISBN-10: 8493328618; ISBN-13: 978-8493328610.

As noted in the Summary, the advantages of the present invention are not limited to an improved rider position. Rather, the present invention also provides an improved rear suspension that maintains a constant belt or chain tension while producing constant-anti-squat characteristics. No previously designed suspension has exhibited both constant belt tension and constant anti-squat factor at the same time. Until the present invention, it has not been understood or appreciated that the driving and idler pulleys could be positioned to provide constant tension and constant anti-squat characteristics at the same time where the idler is located above a line drawn between the center of the rear wheel and the driving pulley. The present invention includes such a method for achieving this advantageous positioning. This alone constitutes a significant advancement in the state of the art of motorcycle design.

As suggested from the immediately preceding paragraph, the anti-squat/constant tension feature is achieved by correct positioning the idler and driving pulleys, but the first step in the inventive procedure is to select the rear suspension dimension and attachment points on the frame; following that the idler and driving pulley are located and configured according to an inventive procedure.

The following procedure sets forth the steps required to locate the driving and idler pulleys such that the belt tension remains approximately constant over the range of suspension travel and simultaneously provides a constant "anti-squat" characteristic. Reference should now be made to FIGS. 7-11.

Preliminarily, note should be taken that a designer of the motorcycle of the present invention has considerable flexibility in the details of the rear suspension dimensions. For instance, the designer is free to choose the lengths of key suspension members, including the adjustable length link 14, the dual arm links 16a, 16b, and the rotatable cross-member 17, along with attachment points 14a', 14b', 17e, 17f, 17g, to the frame 1.

Once the designer has selected the suspension dimensions, the next question is how to locate the idler pulley 13 and driving pulley 11, so that the belt 12 will stay at constant tension over the travel of the rear suspension.

Figure 7:
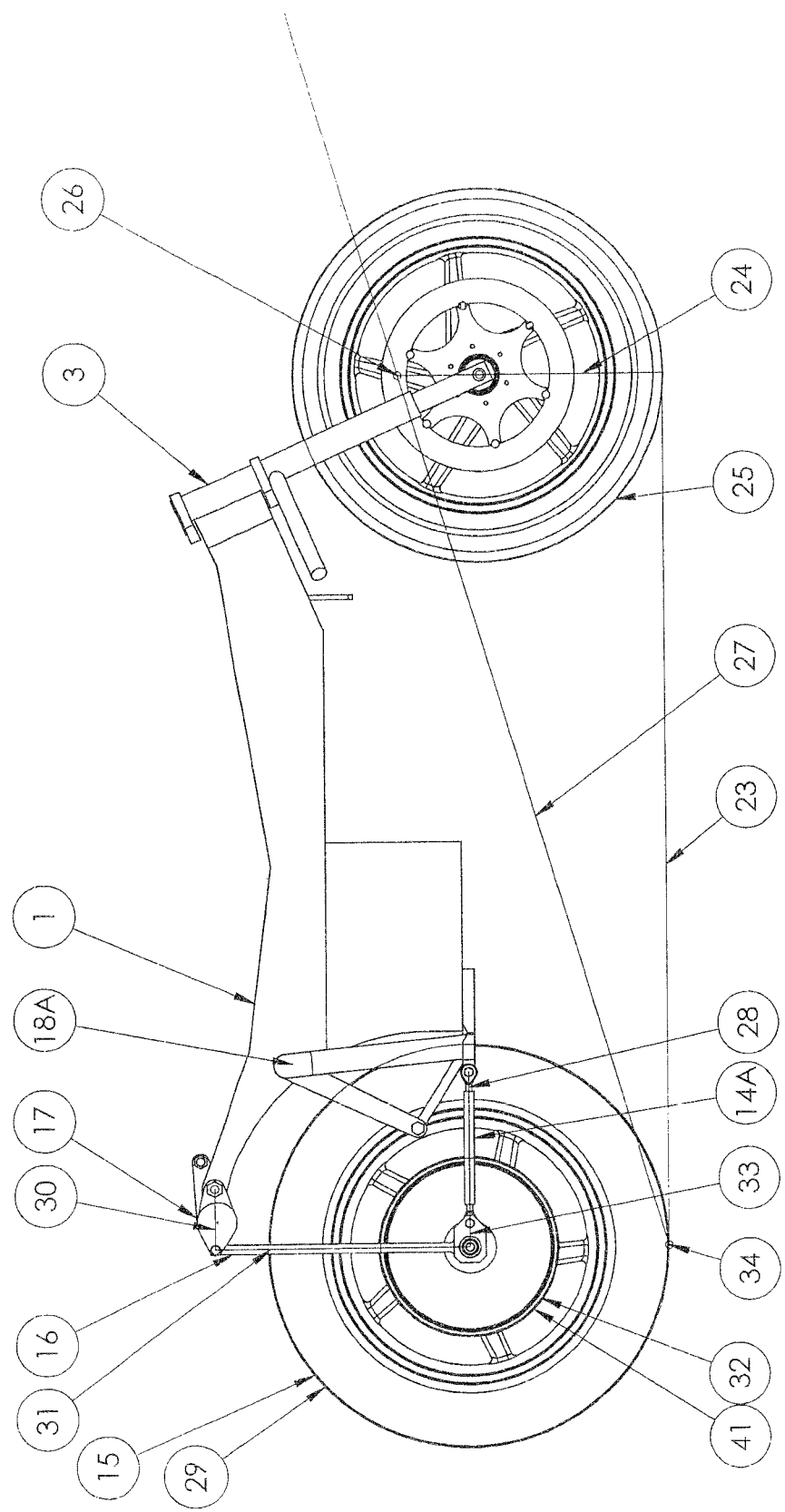
FIG. 7 is a right side view in elevation showing the inventive motorcycle with the engine and drive train removed so as to highlight the rear suspension, select elements of the overall configuration, and to provide a template for locating the driving and idler pulleys so as to ensure constant belt tension and anti-squat characteristics are achieved.

Referring first to FIG. 7, which is a right side view in elevation of the inventive motorcycle including only the frame 1, front suspension 3, driven pulley 41, and rear suspension members 14, 15, 16, and 17. In this view, the front and rear suspensions are positioned in their center of travel.

Figure 8:
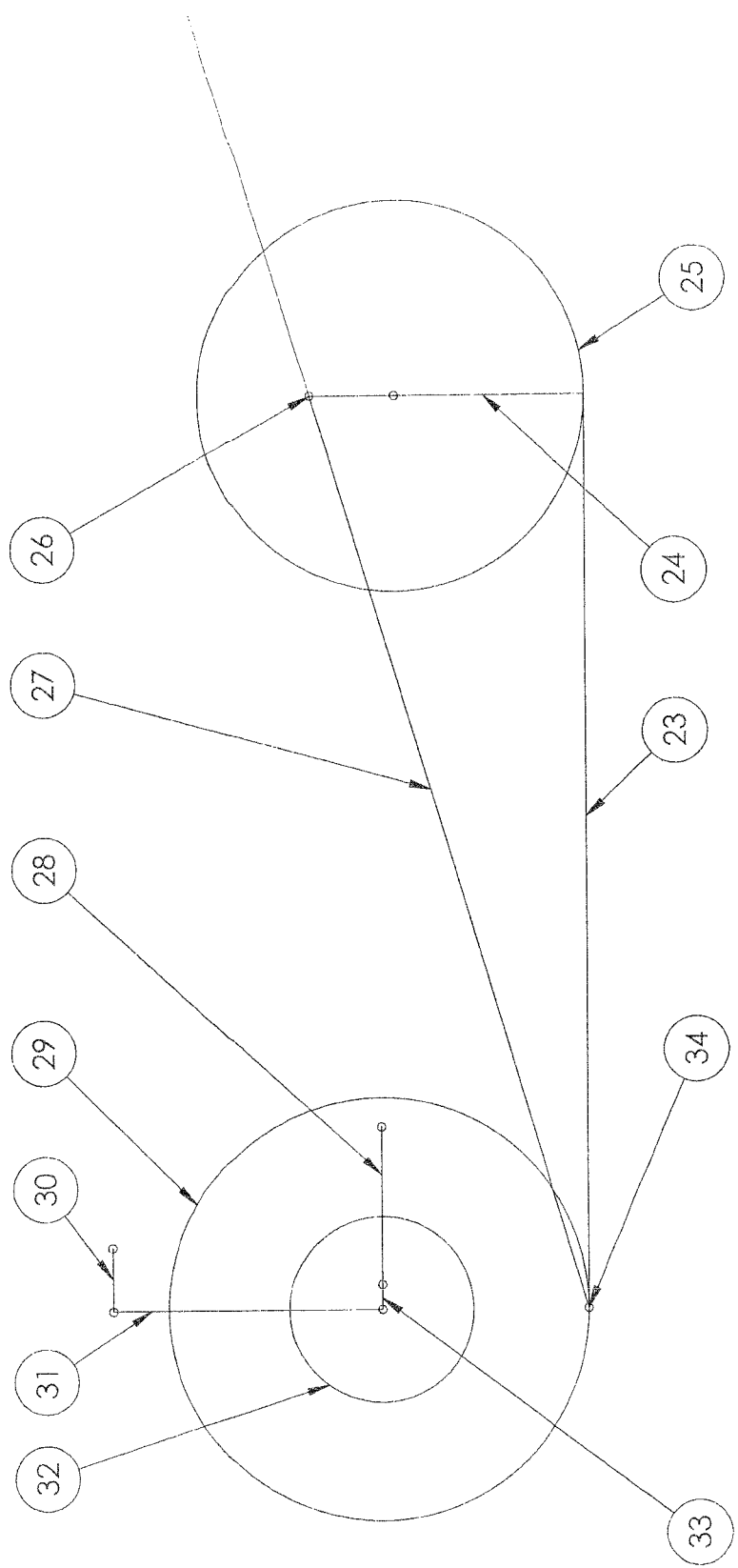
FIG. 8 is a bare sketch or schematic overlay of FIG. 7 comprising the construction lines for commencing the suspension design process.

Next, a two-dimensional sketch is laid over the side view of FIG. 7 with various sketch lines corresponding to various suspension links and other components of the bike. FIG. 7 shows the sketch superimposed on the motorcycle of FIG. 1, and FIG. 8 shows the bare sketch generated from FIG. 7. A legend for the construction lines in each sketch of FIGS. 7-8 includes 23—construction line corresponding to the road when the front and rear suspensions are at the center of travel;

24—construction line passing through the center of the front wheel and having an arbitrary length;

25—construction circle corresponding to the front wheel at the center of suspension travel;

26—construction point at the end of construction line 24;

27—construction line starting at point 34 and passing through point 26;

28—construction line corresponding to adjustable link 14;

29—construction circle corresponding to rear wheel 15;

30—construction line corresponding to rotatable cross member 17;

31—construction line corresponding to a dimension on triangular arm 16;

32—construction circle corresponding to the driven pulley 41;

33—construction line corresponding to a dimension on the triangular arm 16;

34—point at the bottom of construction circle 29.

The anti-squat fraction is determined by the length of construction line 24. This length can be chosen arbitrarily within practical limits.

Figure 9:
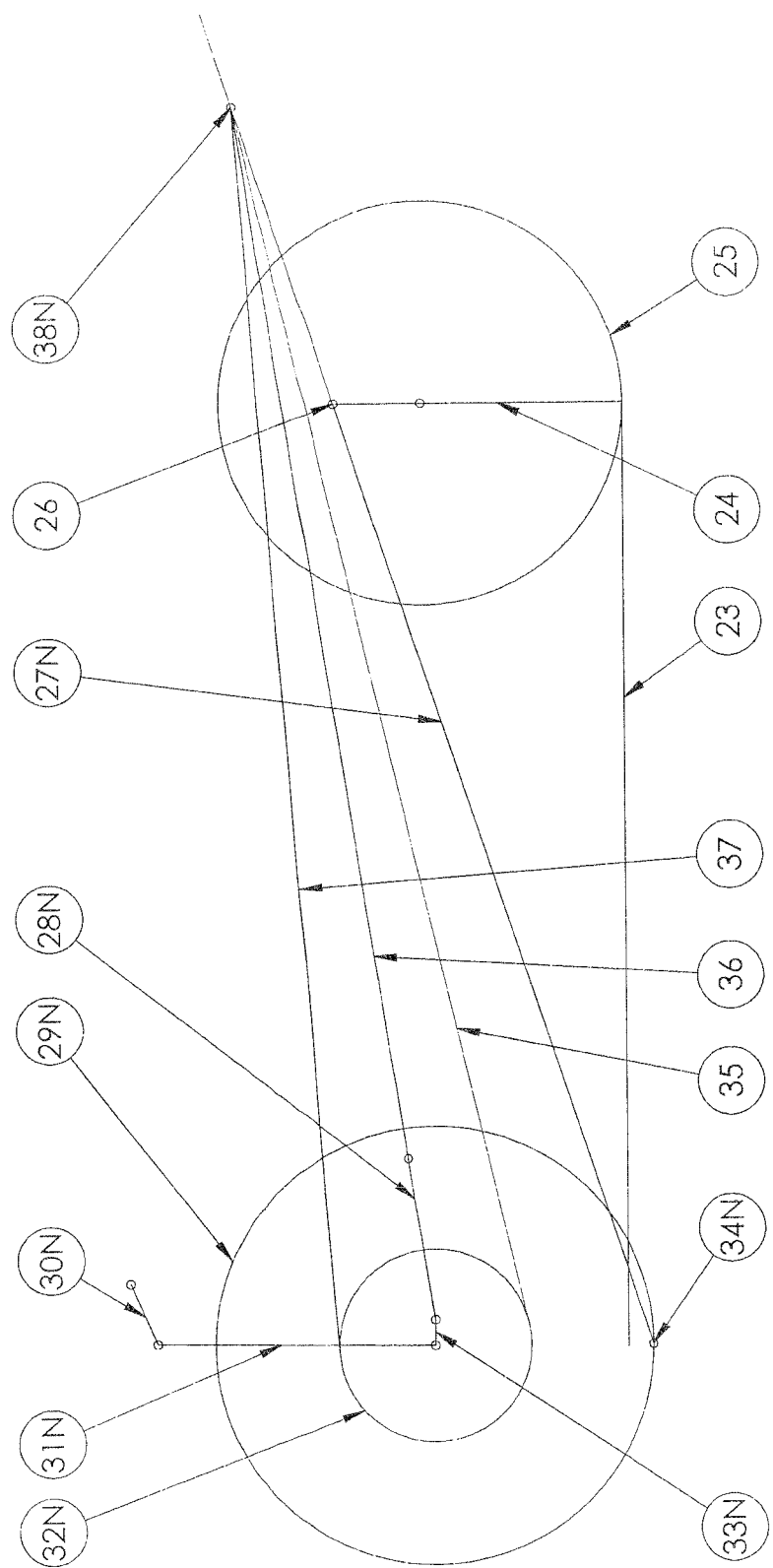
FIG. 9 is a sketch of FIG. 7 showing construction line locations if the rear wheel is dropped (lowered) 33% of total suspension travel.

Next, and referring now to FIG. 9, there is shown the construction line locations if the motorcycle rear wheel is assumed to be dropped from center a distance of 33% of total suspension travel. The reference numbers for the construction lines for each of the views of FIGS. 8-9 are consistent. If a construction line does not move with the suspension, it has the same reference number in each figure. If the construction line does move with the suspension in FIG. 9, it is renumbered with the same number carried over from FIG. 8 with the added suffix of "N".

From this it is seen that FIG. 9 contains four constructions not seen in FIG. 8. They include:

35—construction line from point 38N and tangent to construction circle 32N;

36—construction line collinear with construction line 28N and intersecting construction line 27N at point 38N;

37—construction line from point 38N and tangent to construction circle 32N;

38N—point at which an extension of construction line 28N would intersect construction line 27N.

Figure 10:
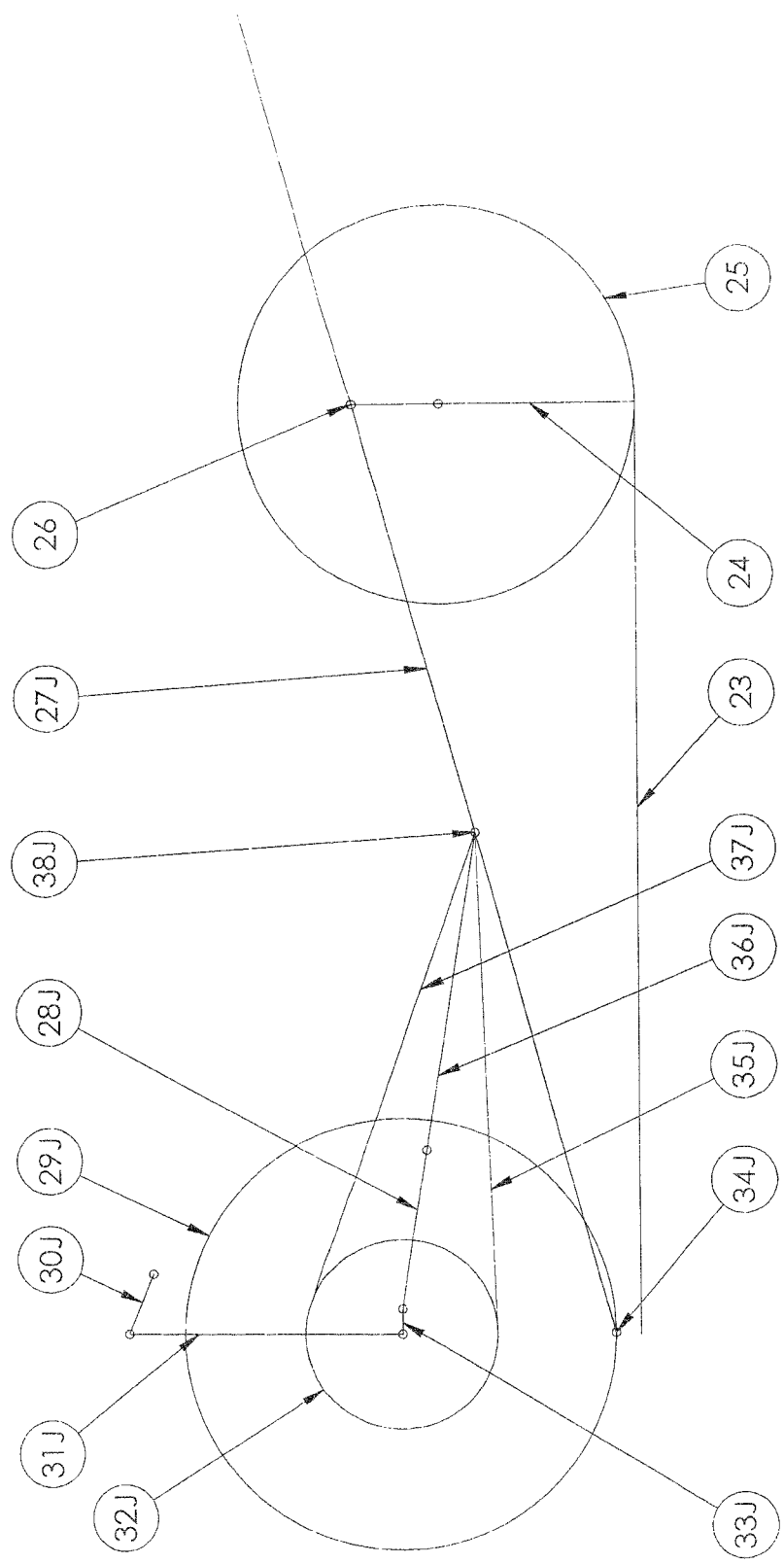
FIG. 10 is the same bare sketch of FIGS. 8 and 9 showing the construction lines if the rear wheel is elevated 33% of total suspension travel.

Next, FIG. 10 shows the construction line locations if the rear wheel is assumed to be raised from center a distance of 33% of the total suspension travel. Reference numbers for the construction lines between FIGS. 8 and 10 are the same: If a construction line does not move with the suspension, it bears the same reference number in each figure. If the construction line does move with the suspension from FIG. 8 to FIG. 10, the new line location in FIG. 10 bears the same numerical portion of the reference number and then includes the alphabetic suffice of "J". Construction lines 35J-38J in FIG. 10 are correlated to construction lines 35-38 in FIG. 9.

Figure 11:
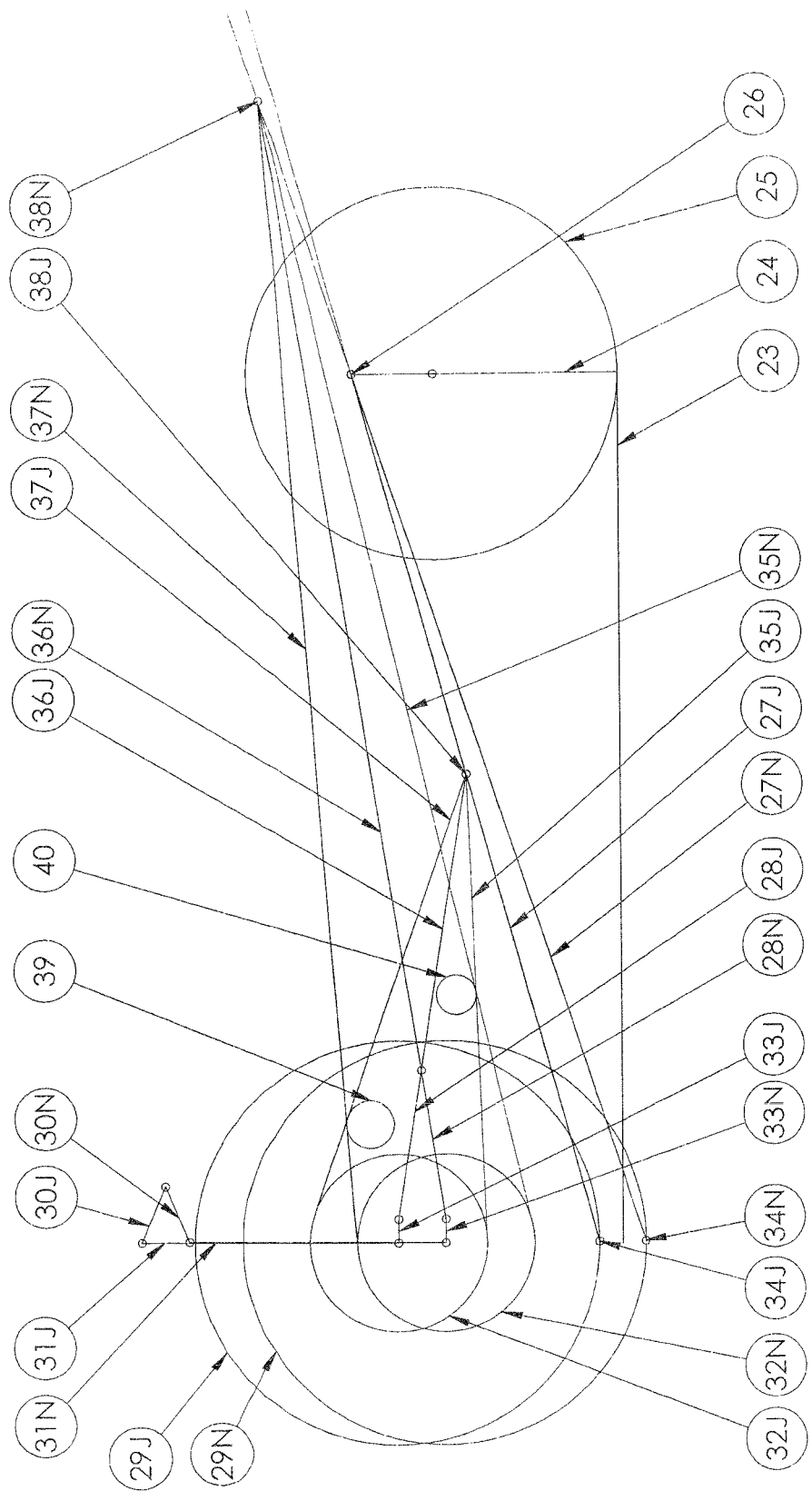
FIG. 11 is the sketch of FIG. 10 superimposed on the sketch of FIG. 9, and including construction circles employed to locate the idler and driving pulleys.

Next, FIG. 11 illustrates FIG. 10 superimposed on FIG. 9 and further includes two circles as described as follows: Circle 39 is tangent to construction lines 37J and 37N. Its diameter and position correspond to the correct position for the idler pulley 13. Its diameter can be selected arbitrarily within practical limits by the designer. Circle 40 is tangent to construction lines 35J and 35N. Its diameter and position correspond to the correct position for the driving pulley 11. Its diameter can also be selected arbitrarily within practical limits by the designer.

At this point the procedure for locating the idler pulley and the driver pulley is complete.

There is a special case that is contemplated and covered by the present invention. Referring again to FIGS. 7 and 8, the foregoing procedure applies equally to the special case when the length of construction line 33 is zero. This corresponds to the kinematics of a conventional rear swing arm for a motorcycle. The constant belt tension and constant anti-squat procedure can be used with a conventional swing arm suspension (see FIGS. 14-16). The spring and damper assembly 19c can comprise any arrangement of linkages and one or more spring and dampers, as is now common practice, and can attach at its lower end 19d to the swing arm and at its upper end 19e to the frame mounting point 1k or other points. The conventional swing arm 42 can attach to the frame in the general location shown in these figures, for instance on the sides of mounting points 1l, 1m, or further forward in front of the rear wheel, also as is now common practice.

Figure 17:
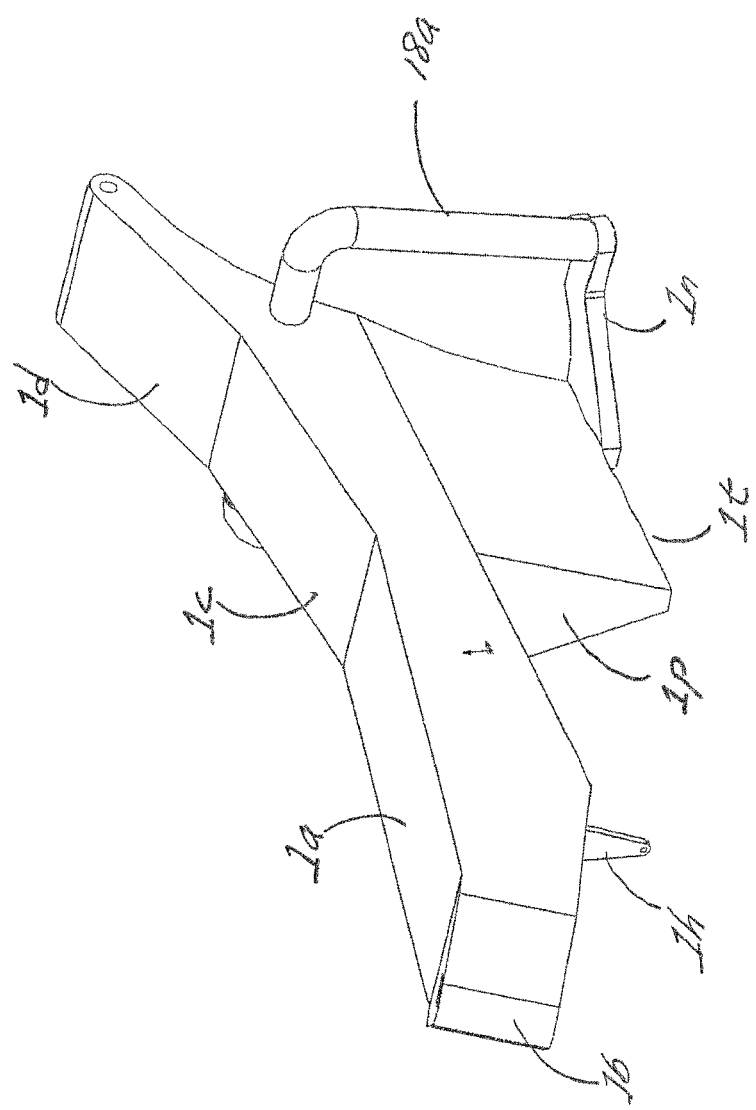
FIG. 17 is an upper left front perspective view of the bare frame of the present invention.
Figure 18:
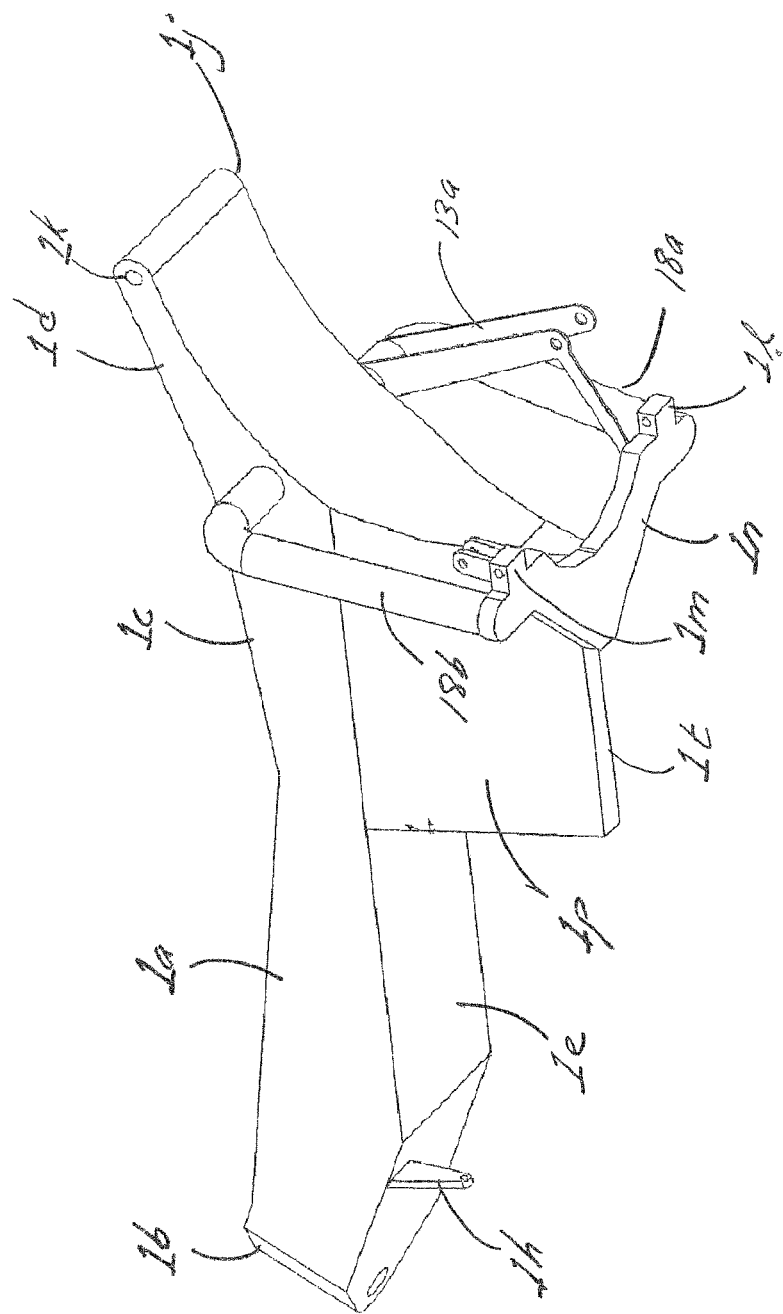
FIG. 18 is a lower left rear view thereof.
Figure 19:
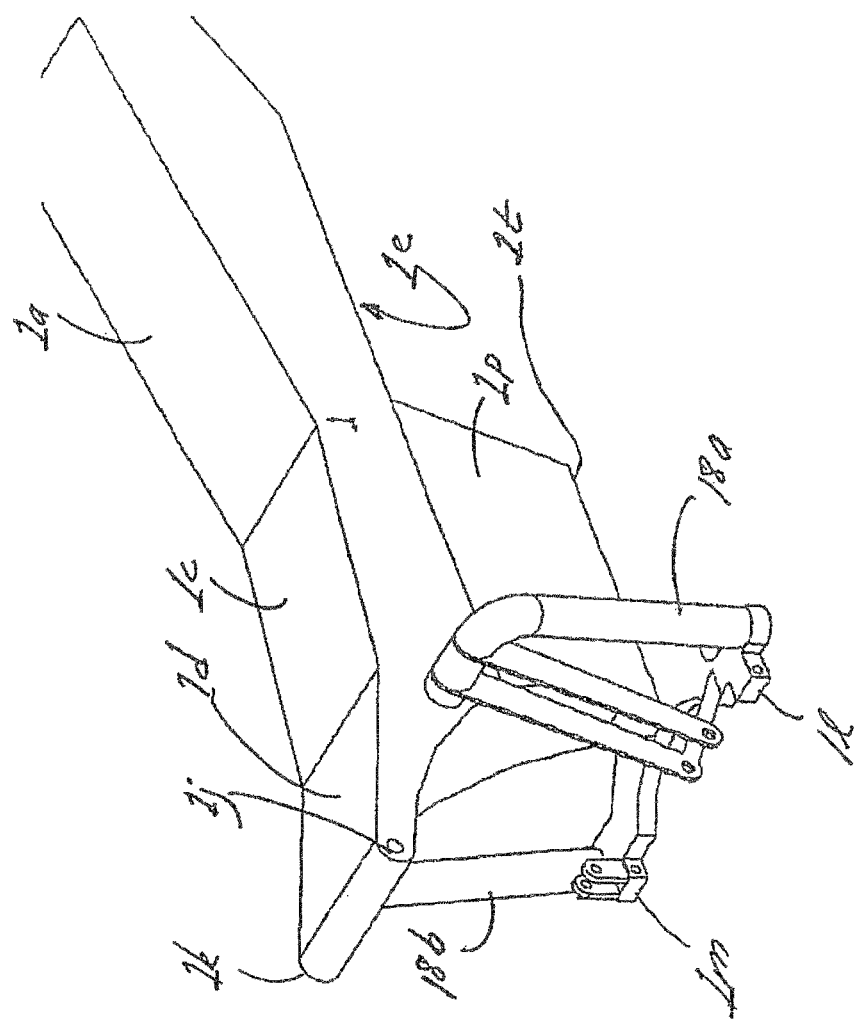
FIG. 19 is an upper right rear view thereof.

FIGS. 17-19 show the bare (monocoque) frame 1 of the present invention. These views feature the structural core of the inventive motorcycle, and certain structural constraints (mounting points, most notably) are necessary to support the inventive motor/engine mounting and rear suspension design systems. However, departures from the preferred geometry are possible and the inventive systems could be realized in numerous frame configurations, including those provided by a tubular space frame. Nonetheless, a monocoque style is preferred. It may be fabricated from sheet metal or composite materials. The frame structure will generally extend from its head tube 1b (pivot axis for steering) over the front wheel slightly aft the centerline to it rotatable cross-member mounting points over and slightly forward the centerline of the rear wheel. From the head tube 1b the front portion 1a of the frame slopes downwardly at its upper surface to a medial seating portion 1c generally level relative to ground plane in use, and then rises slightly to its rear portion 1d, on which the rear suspension mounts. On the underside 1e of the front portion of the frame is a generally space from which the engine is suspended, as described above. Behind the engine mounting area is a triangular trough 1p having right and left sides 1q, 1r that angle inwardly to create a space for the rider's feet on the foot rests provided by foot plate 1n. The center of the bottom of the trough straddles the longitudinal centerline of the motorcycle. In length, the trough extends to a point roughly below the point at which the seat rises upwardly into the rear portion of the frame to the rotatable cross-arm mounting points 1j, 1k, the rear portion being of decreasing width or thickness as measured from top to bottom; in depth it extends downwardly from the medial (seat) portion of the frame to terminate in a trough bottom 1t several inches above the drive shaft 9, such that an open and empty space exists between the trough bottom and the drive shaft. This enables a rider, whose feet are resting on the footplate 1n, to touch his toes together.

The trough provides frame stiffness and structural rigidity, which are critical insofar as it is the scaffold on which are connected, either directly or indirectly, the foot plate 1n, the rear suspension lower mounting points 1l, 1m, the leg portion of the L-shaped idler pulley mounting arm 13a, and the side impact protection bars 18a, 18b.

Figure 20:
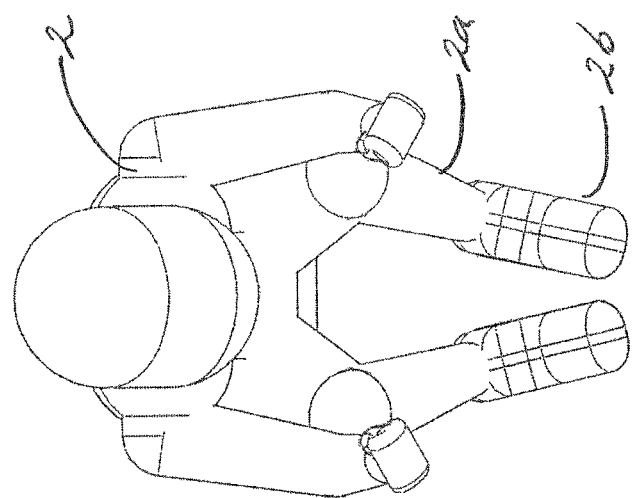
FIG. 20 is a front view in elevation of a rider in the aerodynamic position made possible by the present invention.

Referring finally to FIG. 20, there is shown a front view in elevation of the unique rider position made possible by the present invention; notably, the frame configuration, along with the drivetrain, rear wheel drive configuration, and engine suspension. Note should be taken that the rider's feet are nearly touching, and this is how they are positioned when the rider draws them inwardly to rest on the footplate.

What is claimed as invention is:

1. A rear wheel drive system for a motorcycle having a frame, front suspension, front wheel, and steering assembly connected to a front portion of said frame, an engine disposed in the front portion of said frame, a rear suspension having a predetermined range of travel, a rear wheel having a rear wheel axle connected to a rear portion of said frame and operatively coupled to said rear suspension, said rear wheel axle having an axis of rotation, the rear wheel drive system comprising:
   a driven pulley axially disposed on said rear wheel axle;
   a drive pulley attached to said frame and configured to receive a motive output from the engine, said drive pulley having an axis of rotation;
   an idler pulley attached to said frame and disposed above a line between said axis of rotation of said drive pulley and said axis of rotation of said rear wheel axle; and
   a belt or chain disposed around and operatively connecting said drive pulley, said driven pulley, and said idler pulley;
   wherein said idler pulley and said drive pulley are configured so as to provide substantially constant tension to said belt or chain over the predetermined range of travel of said rear suspension.

2. The rear wheel drive system of claim 1, wherein said rear wheel axle is disposed in a rear wheel bearing, and further including an elongate adjustable link with connection structure for connecting said link between said rear wheel bearing and said motorcycle frame for fine tuning belt tension.

3. The rear wheel drive system of claim 1, wherein said driving and idler pulleys are positioned so as to provide constant tension and constant anti-squat characteristics at the same time.

4. A motorcycle rear suspension comprising:
   an elongate rotatable cross member having a front side and a rear side, said rotatable cross-member having connection points for pivotal connection to a rear portion of a motorcycle frame;
   right and left suspension struts each having a lower end connected to respective right and left rear axle fittings adapted for coaxial placement on a rear wheel axle, and an upper portion having connection points for pivotal connection to said rear side of said rotatable cross member; and
   right and left length-adjustable links having connection means for pivotal connection to said right and left rear axle fittings, respectively, and to the motorcycle frame.

5. The rear suspension of claim 4, wherein said suspension struts are triangular frames.

6. The rear suspension of claim 4, further including connection structure disposed on said front side of said cross member for connecting a spring and damper shock absorber between said cross member and a mounting point on a rear portion of said motorcycle frame so as to support a portion of the motorcycle.

7. The rear suspension of claim 4, wherein said frame connection points on said cross member are on the front side of said cross member.

8. The rear suspension of claim 4, further including a rear spring and damper configured to support a portion of the motorcycle.

9. A rear wheel drive system for a motorcycle having a frame, front suspension, front wheel, and steering assembly connected to a front portion of said frame, an engine disposed in the front portion of said frame, and a rear suspension including a fork pivotally attached to a rear portion of said frame, a rear wheel having a rear wheel axle pivotally connected to a rear portion of said fork, said rear wheel axle having an axis of rotation and said rear suspension having a range of travel, said rear wheel drive system comprising:
   a driven pulley axially disposed on said rear wheel axle;

a drive pulley attached to said frame and configured to receive motive output from the engine, said drive pulley having an axis of rotation;

an idler pulley attached to said frame and disposed above a line between said axis of rotation of said drive pulley and said axis of rotation of said rear wheel axle; and a belt or chain disposed around and operatively connecting said drive pulley, said driven pulley, and said idler pulley;

wherein said idler pulley and said drive pulley are configured so as to provide substantially constant tension to said belt or chain over said range of travel of said rear suspension.

10. The rear wheel drive system of claim 9, wherein said driving and idler pulleys are positioned so as to provide constant tension and constant anti-squat characteristics at the same time.

11. The rear suspension of claim 9, further including a rear spring and damper configured to support a portion of the motorcycle.

* * * * *